United States Patent
Hawighorst et al.

(10) Patent No.: US 11,603,221 B2
(45) Date of Patent: Mar. 14, 2023

(54) PACKING ARRANGEMENT AND METHOD FOR PACKING A PRODUCT IN PLURALITY OF BAGS OR SACKS

(71) Applicant: Windmoeller & Hoelscher KG, Lengerich (DE)

(72) Inventors: Thomas Hawighorst, Hasbergen (DE); Martin Hohenbrink, Hagen a.T.W. (DE); Daniel Narberhaus, Lengerich (DE)

(73) Assignee: WINDMOELLER & HOELSCHER KG, Lengerich (DE)

( * ) Notice: Subject to any disclaimer, the term of this patent is extended or adjusted under 35 U.S.C. 154(b) by 209 days.

(21) Appl. No.: 15/182,959

(22) Filed: Jun. 15, 2016

(65) Prior Publication Data
US 2016/0362202 A1 Dec. 15, 2016

(30) Foreign Application Priority Data
Jun. 15, 2015 (DE) .......................... 102015210974.7

(51) Int. Cl.
| | | |
|---|---|---|
| B65B 1/04 | (2006.01) | |
| B65B 35/50 | (2006.01) | |
| B65B 9/13 | (2006.01) | |
| B65B 43/46 | (2006.01) | |
| G06Q 10/06 | (2012.01) | |
| G06Q 10/0631 | (2023.01) | |

(52) U.S. Cl.
CPC .............. *B65B 1/04* (2013.01); *B65B 9/135* (2013.01); *B65B 35/50* (2013.01); *B65B 43/465* (2013.01); *G06Q 10/063114* (2013.01)

(58) Field of Classification Search
CPC .. B65B 1/04; B65B 1/00; B65B 35/50; B65B 9/135; B65B 57/00; G06Q 10/063114; G05B 2219/45048

USPC .......... 53/396, 447, 540, 441, 556, 459, 567
See application file for complete search history.

(56) References Cited

U.S. PATENT DOCUMENTS

| | | | | | |
|---|---|---|---|---|---|
| 5,121,467 | A | * | 6/1992 | Skeirik | G06N 3/0427 706/23 |
| 5,566,092 | A | * | 10/1996 | Wang | G01N 29/14 706/912 |
| 7,218,980 | B1 | * | 5/2007 | Orshansky | G06Q 10/087 700/121 |

(Continued)

FOREIGN PATENT DOCUMENTS

| | | | | | |
|---|---|---|---|---|---|
| GB | 2499097 A | * | 8/2013 | ........... | G06F 3/0482 |
| WO | WO-2013018074 A1 | * | 2/2013 | ............... | B65B 1/02 |
| WO | WO 2013018074 A1 | * | 2/2013 | ............. | B65B 61/24 |

OTHER PUBLICATIONS

D. Troupis, S. Manesis, N. T. Koussoulas, andT. Chronopoulos; Computer Integrated Monitoring, Fault Identification and Control for a Bottling Line, Systems and Control Division Department of Electrical Engineering, University of Patras, 1995 IEEE pp. 1549-1556 (Year: 1995).*

*Primary Examiner* — Hemant Desai
*Assistant Examiner* — Mobeen Ahmed
(74) *Attorney, Agent, or Firm* — Jacobson Holman PLLC

(57) ABSTRACT

A packaging system for packing a product includes at least one of a bagging unit, a pallet loading device, and a pallet securing device. The packaging system also includes a device to determine information regarding future events associated with the packing of the product, and to render the information available.

6 Claims, 2 Drawing Sheets

(56) References Cited

U.S. PATENT DOCUMENTS

| | | | | |
|---|---|---|---|---|
| 8,417,432 B2* | 4/2013 | Butler | | G05B 23/0281 |
| | | | | 701/100 |
| 8,494,826 B2* | 7/2013 | Richards | | G05B 17/02 |
| | | | | 703/7 |
| 8,751,413 B2* | 6/2014 | Nagathil | | G05B 23/0278 |
| | | | | 706/1 |
| 9,104,650 B2* | 8/2015 | Hosek | | G05B 23/0283 |
| 9,157,832 B2* | 10/2015 | Uluyol | | G01H 3/00 |
| 9,256,224 B2* | 2/2016 | Herzog | | G06K 9/6215 |
| 2005/0222889 A1* | 10/2005 | Lai | | G06Q 10/06 |
| | | | | 705/7.41 |
| 2007/0067678 A1* | 3/2007 | Hosek | | G05B 23/0235 |
| | | | | 714/25 |
| 2007/0294982 A1* | 12/2007 | Knoke | | B65B 1/36 |
| | | | | 53/451 |
| 2008/0243434 A1* | 10/2008 | Boutin | | B65B 57/00 |
| | | | | 702/179 |
| 2009/0044491 A1* | 2/2009 | De Pietra | | B65B 57/00 |
| | | | | 53/507 |
| 2010/0042445 A1* | 2/2010 | Nicosia | | G06Q 50/30 |
| | | | | 715/810 |
| 2010/0071317 A1* | 3/2010 | Michels | | B65B 9/135 |
| | | | | 53/567 |
| 2010/0241247 A1* | 9/2010 | Attarwala | | G05B 19/4063 |
| | | | | 700/32 |
| 2012/0150333 A1* | 6/2012 | De Luca | | G06V 40/20 |
| | | | | 700/109 |
| 2016/0132046 A1* | 5/2016 | Beoughter | | G06F 16/248 |
| | | | | 700/17 |
| 2016/0362203 A1* | 12/2016 | Hawighorst | | B65B 65/003 |
| 2020/0160242 A1* | 5/2020 | Johnson | | G06Q 10/06311 |
| 2022/0215309 A1* | 7/2022 | Nakashima | | G06Q 10/06311 |

* cited by examiner

PACKING ARRANGEMENT AND METHOD FOR PACKING A PRODUCT IN PLURALITY OF BAGS OR SACKS

BACKGROUND OF THE INVENTION

1. Field of the Invention

The invention relates to a packing arrangement and a method for packing a product in a plurality of bags or sacks.

2. Description of Related Art

Frequently, larger quantities of a product which is particularly free flowing, pourable, or flowable are packed in such a packing arrangement in quantities that can be transported.

Such a packing arrangement is arranged over a larger area so that the operator can oversee the entire equipment with difficulty only. In particular, alarms may be overlooked. Additionally, the operation of the entire arrangement is time-consuming due to the spatial distances and thus difficult.

SUMMARY OF THE INVENTION

The objective of the present invention is therefore to further develop a packing arrangement and a method for packing a product in a plurality of bags or sacks such that it can be operated more quickly, in spite of its size.

The objective is attained in the features of the invention described herein. The description illustrates additional embodiments of the packing arrangement according to the invention and the inventive method, with it being possible to use the features mentioned in the context with the packaging arrangement according to the invention also in connection with the inventive method and vice versa, so that here mutually the respective features can be, or indeed are, referenced.

According to the invention the packing arrangement may comprise a bagging unit, in which the product, frequently stored in a silo, is bagged into individual bags or sacks. Such arrangements are called form fill seal machines, because from a tubular material individual bags are generated, open at the top, which are also filled with the product in said device, and are sealed at the upper, open end.

According to the invention, the packing arrangement may comprise a device for placing a plurality of bags or sacks filled with the product onto a pallet, with several generally successively supplied bags being combined and arranged in a layer. Several such layers are successively stacked on a pallet until a desired height is reached.

Such a packing arrangement according to the invention may comprise a load securing device for securing the pallets loaded with bags (pallet securing device), whereby, in general, the pallet loaded with bags being wrapped with a plastic coating (stretch hood), or with a film, particularly a stretch film. Such a secured pallet can now be transported, in general.

The invention now includes one of these devices or a combination thereof as desired.

According to the present invention a device is provided for determining and rendering available information regarding future events. If the operator is informed of future events early or at least in due time, he/she can react to these events at the right point of time. This way it can be avoided, for example, that the packing arrangement reaches a shut-off state when the operator is not prepared for the event. The device for determining and rendering information available may here be integrated in the arrangement and comprise a computing and storage device. The device may additionally include a control and information system, by which information regarding events can be displayed such that the operator gains access to the information. In addition to information regarding future events, here information regarding past events can be displayed, with the information beneficially being saved in the storage device. The information of past events can here be recalled from the storage device and evaluated by the computing device, with the computer being implemented to combine said information regarding past events and process it into information concerning future events. Such information can then be displayed preferably via a terminal, which represents a component of the arrangement or may be arranged outside the arrangement. Additionally, the terminal can allow for a request for response by the operator. For this purpose the terminal comprises preferably a display device, such as a monitor, by which the future events can be transmitted to the operator.

In an advantageous embodiment of the invention the future events represent various tasks to be executed by at least one operator of the arrangement. These tasks may include various maintenance tasks, such as cleaning the arrangement, controlling the arrangement, refilling lubricants or other operating means. Other tasks may relate to the product to be bagged or the packing means, allowing here for example to display a required exchange of the rolls of packing means, particularly the exchange of the tubular film, from which the bags can be produced. An upcoming end of a job can also be indicated.

Furthermore, an input device according to the invention is provided, by which the operator can execute allocations to another person, the acceptance and/or rejection of a task based on the information provided, and/or an amendment of the information. In other words, the operator can react to information, particularly to tasks, with the operator having a limited number of optional reactions. For example, he/she may accept the tasks or reject it. This means that he/she informs via the input device if he/she intends to perform the tasks or intends to abstain therefrom. Furthermore, he/she can allocate the task to another person, for example when the user already has additional tasks to be performed. Another option allows the operator to amend the information, which then can be saved in the storage device. This option may be beneficial in order to allow for the provision of a reason for a rejection. Here, keyboards, computer mice, other indicators, and/or touchscreens are potential input devices. In particular, a touchscreen may be a component of a mobile terminal, such as a smartphone or a computer tablet.

In order to allow entries made by the operator being saved, preferably here a storage devices is provided. It may be identical to the above-described storage device for saving information regarding events.

BRIEF DESCRIPTION OF THE DRAWINGS

Additional advantages, features, and details of the invention are discernible from the following description, in which various embodiments are described in detail with reference to the drawings. Here, the features mentioned in the claims and the description are each potentially relevant for the invention individually or in desired combinations of the features mentioned. Within the scope of the entire disclosure, features and details described in the context of the method according to the invention also apply within the context of the inventive packing arrangement and vice versa, so that with regards to the disclosure of the individual aspects of the invention mutual reference is always made or can always be made. The individual figures show:

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from, this detailed description.

Figure 1:
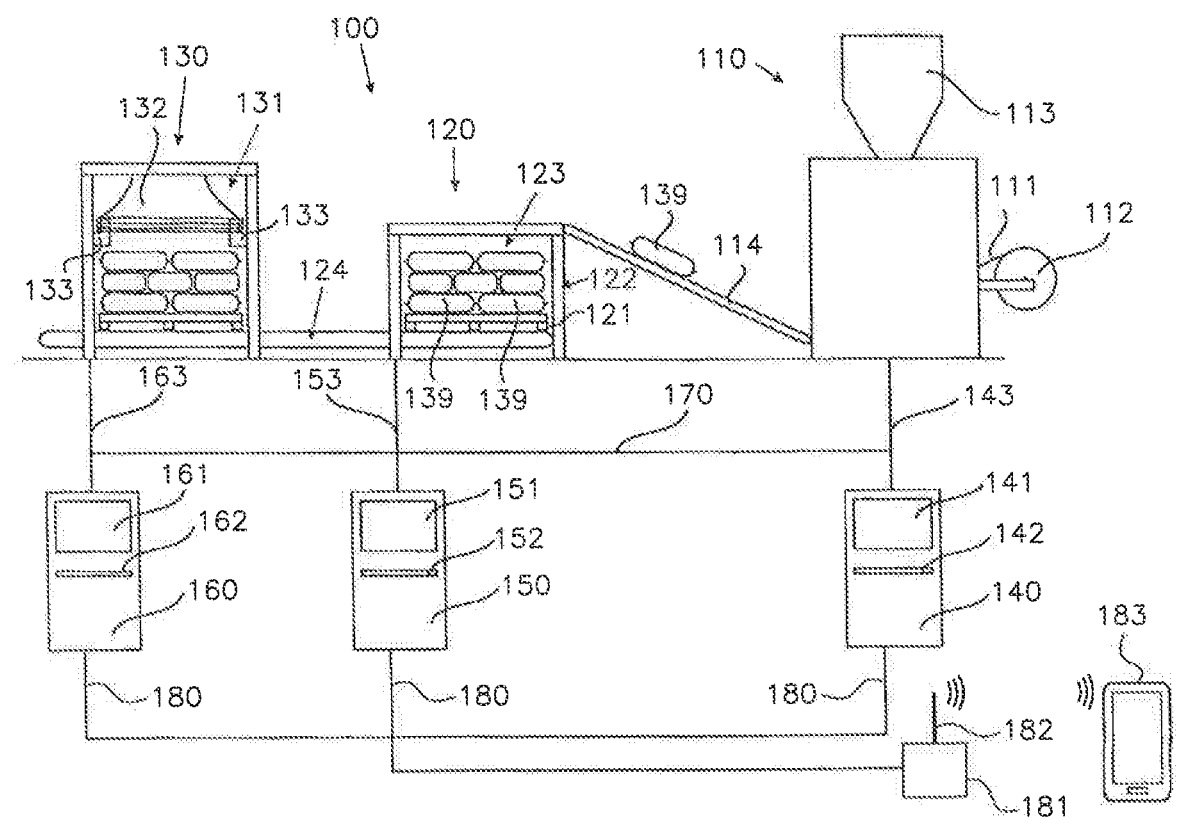
FIG. 1 schematic illustration of a packing arrangement according to the invention, FIG. 2 illustration of the function of a data filter of a packing arrangement according to the invention, FIG. 3 monitor display of a device of the packing arrangement according to the invention.

FIG. 1 shows a schematic illustration of a packing arrangement 100 according to the invention, (comprising) a bagging unit 110, a pallet loading device 120, and a load securing device 130. The bagging device 110 is supplied with a tubular packing means 111, which is stored on a roll 112. This packing means 11 is pulled off the roll 112. The front end of this packing means 111 is provided with a bottom seam and cut to a bag length such that a bag is formed, which is open towards the top. It is grasped at its upper end by a pair of graspers and transported to a filling station. Here, the upper end is pulled such that the inside of the bag becomes accessible. Now the bag can be filled with the product to be bagged, which is freely flowing, but represents a solid substance (thus is not a liquid) in the desired quantity, for example 25 kg. The product is here stored in a silo 113 and is taken therefrom. Subsequently the still open but already filled bag is moved to a sealing station, in which a head seam is applied, sealing the bag, generally by way of a welding process.

The filled bags 139 are now transported with a transport device 114, which may comprise several conveyer belts, to the pallet loading device 120. Here, several bags 139 are collected above a pallet 121 and arranged there. This arrangement of bags is placed onto the pallet and forms there a bag layer 122. In this bag layer the bags are generally arranged varying in reference to the previous bag layer, in order to this way increase the stability of the slack of bags 123.

The completely loaded pallet 121 is now moved by a conveyer device 124 to the load securing device 130, where the loaded pallet is provided with a cover, a so-called stretch hood 131. For this purpose respectively one gathering finger 133 is arranged at each corner, above the loaded pallet, on which a film hose 132 is stored showing a certain length. Subsequently the gathering fingers 133 move diagonally towards the outside, so that seen in the horizontal direction they are outside the dimensions of the pallet. Here the film hose 132 is stretched. Mow the gathering fingers can move downwards and here successively release the film hose so that a smooth hood develops over the loaded pailet. Before or during the downwards motion of the gathering fingers the film hose 132 is severed according to the length required and closed with a welding seam so that the hood 131 is closed at the top. The stretched hood serves not only to securely keep the bags on the pallet during transportation, but it can also serve for protection from environmental influences, such as moisture.

Each of the above-mentioned devices 110, 120, 130 comprise in this exemplary embodiment a control and information device 140, 150, 160, which saves and renders available respective information regarding events in the respective device. For this purpose, the storage device may comprise a computer and at least one bulk memory component, for example in the form of a hard drive, on a magnetic basis and/or a solid-state drive (semiconductor drive). In this storage component information can now be saved regarding various but specified events. Some of these events, for example "production of a filled bag or sack" occur continuously, while other events may occur irregularly. However, storage regarding the respective information occurs for all events.

The control and information device 140, 150, 160 may respectively also comprise a monitor 141, 151, 161, on which illustrations can be displayed comprising the various information saved. Furthermore, an input device 142, 152, 162 may be provided, by which, for example, commands can be entered leading to the above-mentioned illustrations. Data conductors 143, 153, 163 lead from the various components of the devices to the storage device 140, 150, 160.

Furthermore, a data conductor 170 is shown, networking together the devices and also the control and information devices. This way it is possible to access from one of the control and information devices 140, 130, 160 all other control and information devices 140, 150, 160 and/or the devices 110, 120, 130.

From the control and information devices 140, 150, 160 additional data conductors 180 lead to a data provider 181, with its objective being to make information available to other devices. For this purpose the data provider 181 can communicate data with the control and information devices 140, 150, 160 so that the data provider gathers the information, reformats it if necessary, and renders it available to at least one terminal. The data provider 181 can also be connected to one or two control and information devices 140, 150, 160 or integrated therein, whereby information from the other control and information devices can then be transmitted via the data conductor to that control and information device.

In the present exemplary embodiment the data provider 181 wirelessly transmits the data via an antenna 182 to a terminal, here a smartphone 183.

The input devices 142, 152, 162 as well as the smartphone 183 can be used to allow the operator to enter a response to the tasks, which can be displayed by the control and information devices 140, 150, 160 or the smartphone 183. These entries can also be saved in the control and information devices 140, 150, 160.

Figure 2:
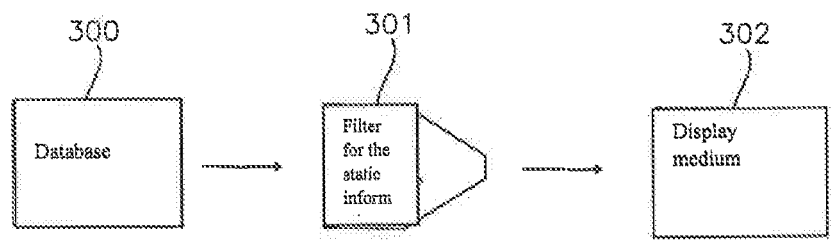

FIG. 2 shows an illustration of the function of a data filter of a packing arrangement according to the invention. There a database is shown which provides a software connection of events and the corresponding information, as well as organizing the storage in the storage components. Additionally, the database provides information also in case of inquiries.

Figure 3:
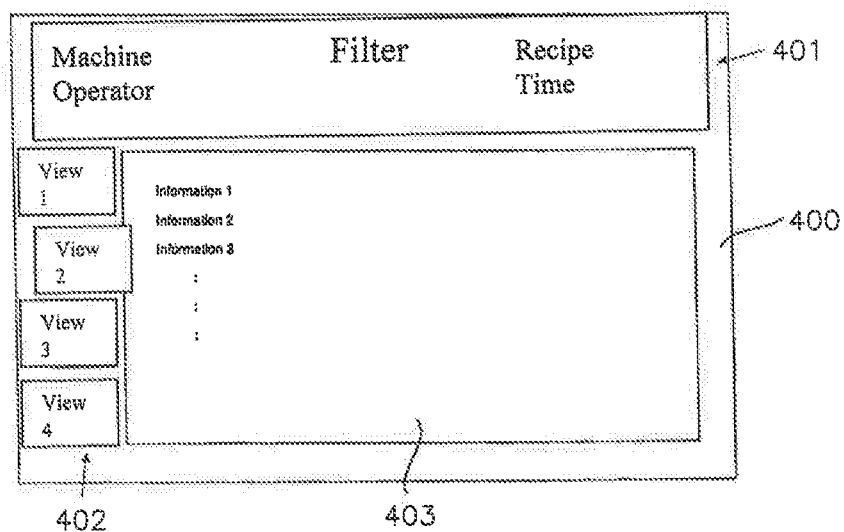

In a special data inquiry data can now be obtained in the embodiment shown, with only search criteria and/or search ranges being permitted for the static information. For example the user, the recipe, the time, and the machine can be determined for the data inquiry. For example, all information can be searched for allocated to events which occurred within the most recent 24 hours. A respective data inquiry in the dynamic information is not provided. The data inquiry is shown in FIG. 3 as filter 301. The data inquiry can then be disclosed to the user by a display medium 302, for example a monitor. The above-mentioned data inquiry can also be organized by the terminal. For this purpose, the data inquiry is transmitted from the terminal via the data provider initially to the control and information devices, in which advantageously the information is determined. It is then in turn transmitted via the data provider to the terminal for the purpose of displaying it. In this display, it is possible in a further view [sic]

FIG. 3 shows an embodiment for an illustration of the results of a data inquiry on a monitor 400 of a one of the control or information systems or a terminal located outside the packing arrangement according to the invention. In a display range 401 the filter is shown, i.e. the lettering "filter" represents the filter name. Under this filter name the filter can be stored or newly saved with the respective search criteria. Now, all events are displayed in the illustration range 402 or all events are shown that match the static information of the search criteria. The indicated event is shown in FIG. 3 as view 1, view 2, etc. A view can now be selected, in which all static and/or dynamic information regarding the selected event can be displayed. For this purpose, the illustration field 403 is provided. In this illustration, in another view, for example in the display range 402, future events can also be displayed, thus events for which the computer has calculated information, particularly the time of the occurrence. In another view, not shown, the operator has the option to respond to the information, allowing entries to be made in the appropriate cells via the input device 142, 152, 162 and/or the smartphone 183.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

| List of reference characters | |
|---|---|
| 100 | Packing arrangement |
| 110 | Bagging device |
| 111 | Packing means |
| 112 | Roll |
| 113 | Silo |
| 114 | Transportation device |
| 120 | Pallet loading device |
| 121 | Pallet |
| 122 | Bag layer |
| 123 | Stack of bags |
| 124 | Conveyer device |
| 130 | Load securing device |
| 131 | Stretch hood |
| 132 | Film hose |
| 133 | Gathering fingers |
| 139 | Filled bags |
| 140, 150, 160 | Control and information device |
| 141, 151, 161 | Monitor |
| 142, 152, 162 | Input device |
| 170 | Data conductor |
| 180 | Data conductor |
| 181 | Data provider |
| 182 | Antenna |
| 183 | Smartphone |
| 301 | Filter |
| 302 | Display medium |
| 400 | Monitor |
| 401 | Filter |
| 402 | Illustration range |
| 403 | Illustration range |

What is claimed is:

1. A packaging system for the packaging of bulk, granulate, or flowable products in a plurality of bags or pouches, said packaging system comprising:
   a bagging system, which produces from tubular material, the bags or pouches, which are open at a top end thereof during a filling step and which are then closed at the top end,
   a pallet loading system, which feeds in succession a plurality of the filled bags or pouches and arranges the filled bags or pouches in a layer on a pallet, with a plurality of the layers being stacked successively on the pallet, and
   a pallet securing system, which covers a pallet stacked with the bags or pouches with a plastic film or wraps the bags or pouches with a foil; and
   a system to determine and provide information about future events associated with the packaging of the bulk, granulate, or flowable products with the bagging system, the pallet loading system, and the pallet securing system, the system including a computing device and a storage device, a control and information system, and an input device,
   the computing device being configured to retrieve and analyze information about past events from the storage device, to combine the retrieved and analyzed information about the past events, and to process the combined information to provide the information about the future events associated with the packaging,
   the control and information system including a screen or a terminal device that is located separate from the packaging system, with a first display area being provided for a data filter on the screen or the terminal device, and a second display area being provided to display the information about the future events, and
   the input device being usable by a human operator of the packaging system to accept or reject a task associated with the information about the future events, to delegate to another human operator a task associated with the information about the future events, to supplement the information about the future events, and to amend the information about the future events by providing a reason for a rejection of a task so as to provide for uninterrupted operation of the packaging system.

2. The packaging system according to claim 1, wherein the future events are tasks, which the human operator of the packaging system is to perform.

3. The packaging system according to claim 2, further comprising an indicator device, which transmits to the human operator the information about the future events.

4. The packaging system according to claim 1, further comprising a second storage device, which is used to save the information that is input by the human operator.

5. A process for the packaging of bulk products, said process comprising:
   a bagging of the bulk products in individual bags or pouches produced from tubular material, the individual bags or pouches being open at a top end thereof during a filling step, and then being closed at the top end,
   a pallet loading of a plurality of the bags and pouches, including feeding a number of the filled bags or pouches successively and arranging the bags or pouches in a layer on a pallet, with a plurality of the layers being stacked successively on the pallet, and
   a securing of the bags or pouches stacked on the pallet, with the pallet stacked with the bags or pouches being covered with a plastic film or wrapped with a foil; and via a system having a computing device and a storage device, a control and information system, and an input device, using the computing device and the storage device to determine and provide information about future events associated with the packaging of the bulk products with the bagging step, the pallet loading step, and the securing step, using the computing device to retrieve and analyze information about past events from the storage device, to combine the retrieved and analyzed information about the past events, and to process the combined information to provide the information about the future events associated with the packaging, using the control and information system, which includes a screen or a terminal device that is located separate from the packaging system, to display on a first display area of the screen or the terminal device a data filter, and to display on a second display area the information about the future events, and using the input device to enable a human operator of the packaging system to accept or reject a task associated with the information about the future events, to delegate to another human operator a task associated with the information about the future events, to supplement the information about the future events, and to amend the information about the future events by providing a reason for a rejection of a task so as to provide for uninterrupted operation of the packaging system.

6. A packaging system for the packaging of bulk, granulate, or flowable products in a plurality of bags, said packaging system comprising:

a bagging system, which produces from tubular material, the bags, which are open at a top end thereof during a filling step and which are then closed at the top end, a pallet loading system, which feeds in succession a plurality of the filled bags and arranges the filled bags in a layer on a pallet, with a plurality of the layers being stacked successively on the pallet, and a pallet securing system, which covers a pallet stacked with the bags with a plastic film or wraps the bags with a foil; and a system to determine and provide information about a future event associated with the packaging of the bulk, granulate, or flowable products with the bagging system, the pallet loading system, and the pallet securing system, the system including a computing device and a storage device, a control and information system, and an input device, the computing device being configured to retrieve and analyze information about past events from the storage device, to combine the retrieved and analyzed information about the past events, and to process the combined information to provide the information about the future event associated with the packaging, the control and information system including a screen or a terminal device that is located separate from the packaging system, with a first display area being provided for a data filter on the screen or the terminal device, and a second display area being provided to display the information about the future event, and the input device being usable by a human operator of the packaging system to input information about the future event to the system to determine, provide, and amend information, by providing a reason for a rejection of a task, about the future event so as to provide for uninterrupted operation of the packaging system, the future event being the periodic required exchange of rolls of tubular film from which the bags are produced.

* * * * *